United States Patent [19]

Pavlath

[11] Patent Number: 4,907,848
[45] Date of Patent: Mar. 13, 1990

[54] HOLOGRAPHIC ROTARY AND LINEAR ENCODER AND METHOD

[75] Inventor: George A. Pavlath, Thousand Oaks, Calif.

[73] Assignee: Litton Systems, Inc., Beverly Hills, Calif.

[21] Appl. No.: 231,334

[22] Filed: Aug. 12, 1988

[51] Int. Cl.$^4$ .............................................. G02B 5/32
[52] U.S. Cl. .................................. 350/3.75; 350/3.73; 350/96.13; 356/151
[58] Field of Search ................... 350/3.73, 3.75, 96.13, 350/151; 370/4

[56] References Cited

U.S. PATENT DOCUMENTS

| | | | |
|---|---|---|---|
| 4,021,606 | 5/1977 | Takeda et al. | 350/3.75 |
| 4,389,090 | 6/1983 | LeFevre | 350/96.29 |
| 4,493,528 | 1/1985 | Shaw et al. | 350/96.15 |
| 4,510,575 | 4/1985 | Mueller et al. | 350/3.75 |
| 4,611,885 | 9/1986 | Boirat | 350/96.20 |
| 4,729,622 | 3/1988 | Pavlath | 305/96.15 |

OTHER PUBLICATIONS

Bergh, et al., "Single Mode Fibre Optic Directional Coupler," Electronics Letters, Mar. 27, 1980, vol. 16, No. 7, pp. 260–261.

Primary Examiner—Bruce Y. Arnold
Assistant Examiner—J. Ryan
Attorney, Agent, or Firm—Lynn & Lynn

[57] ABSTRACT

An encoder includes a holographic element containing a plurality of holograms, one single mode fiber input line and N fiber optic output lines, which may be either single mode or multimode optical fiber. A light source is arranged to illuminate a selected one of the holograms. Each hologram is configured to receive an input light beam from the light source and to produce therefrom an optical output signal encoded to correspond to a digital word. A system for forming the optical signal encoder includes a light source and an arrangement for receiving a first light beam therefrom and producing a light beam array. The system includes an optical switching arranged to receive all of the beams of the light beam array and transmit only selected beams therefrom. A holographic element is arranged such that the beams transmitted by the optical switching means may impinge thereon to form source beams for forming an array of holograms. The system further includes an arrangement for receiving a second light beam from the light source and directing the second beam to a selected portion of the holographic element to form a reference beam for production of a hologram in the holographic element.

10 Claims, 5 Drawing Sheets

HOLOGRAPHIC ROTARY AND LINEAR ENCODER AND METHOD

BACKGROUND OF THE INVENTION

This invention relates generally to apparatus and method for transmitting coded signals from one place to another. More particularly, this invention relates to an optical encoding system. Still more particularly this invention relates to the use of a holographic element and a fiber optic array to transmit encoded signals.

It is desirable in many signal transmission applications to have the capability of sending an encoded signal without requiring an electrical power input at the encoder. The ability to provide rotary and linear position encoding without an electrical power input provides freedom from electromagnetic interference and other environmental effects. Some previous optical encoders require arrays of directional couplers to read out the various tracks. Other previous encoders are analog devices that have high sensitivity to environmental parameters such as optical source power, temperature changes and fiber loss.

SUMMARY OF THE INVENTION

The present invention provides an encoder with a digital output and which requires no coupler for its operation. An encoder according to the present invention includes a plurality of holograms, one optical fiber input line and N fiber optic output lines, which may be either single mode or multimode optical fiber.

The plurality of holograms are arranged to receive light from a light source to illuminate a selected one of the holograms. Each hologram is configured to receive an output light beam from the light source and to produce therefrom an optical output signal encoded to correspond to a digital word. In one embodiment of the invention, the plurality of holograms preferably are arranged to be angularly spaced apart around the circumference of a circle. The holograms may also be linearly spaced apart.

The optical signal encoder according to the present invention preferably also includes means for focussing light from the light source at a predetermined location and means for moving the holographic element to place a selected one of the plurality of holograms at the location where the light from the source is focussed.

A method for encoding optical signals according to the present invention comprises the steps of providing a light source, forming a holographic element having a plurality of holograms thereon, arranging the holographic element to receive light from the light source to illuminate a selected one of the holograms, and configuring each hologram to receive an input light beam from the light source so as to produce therefrom an optical output signal encoded to correspond to a digital word.

A system for forming an optical signal encoder according to the present invention comprises a light source and means for receiving a first light beam from the light source and producing a light beam array that includes a plurality of light beams. The system also includes an optical switching array arranged to receive all of the beams of the light beam array and transmit only selected beams therefrom. A holographic element is arranged such that the beams transmitted by the optical switching means may impinge thereon to form source beams for forming an array of holograms on the holographic element. The system further includes means for receiving a second light beam from the light source and directing the second beam to a selected portion of the holographic element to form a reference beam for production of a hologram in the holographic element.

The means for receiving a first light beam from the light source and producing a light beam array that includes a plurality of light beams preferably comprises a first optical fiber arranged to receive the first light beam from the light source and a 1XN optical coupler having the first optical fiber arranged to provide the first beam thereto and arranged to divide the first light beam between N optical fibers. The optical switching means preferably comprises N optical switches arranged to control whether light propagates in the fibers to the holographic element. The system preferably further comprises means for controlling the polarization of the light beams propagating in each of the N optical fibers such that the source and reference beams used to produce each hologram on the holographic element have substantially identical polarizations. The system may further comprise means for moving the holographic element so that the array of holograms is formed with each hologram in the array being located at a predetermined position in the holographic element. The means for moving the holographic element may comprises means for rotating the holographic element about a selected axis or means for linearly translating the holographic element.

DESCRIPTION OF THE PREFERRED EMBODIMENT

Figure 1:
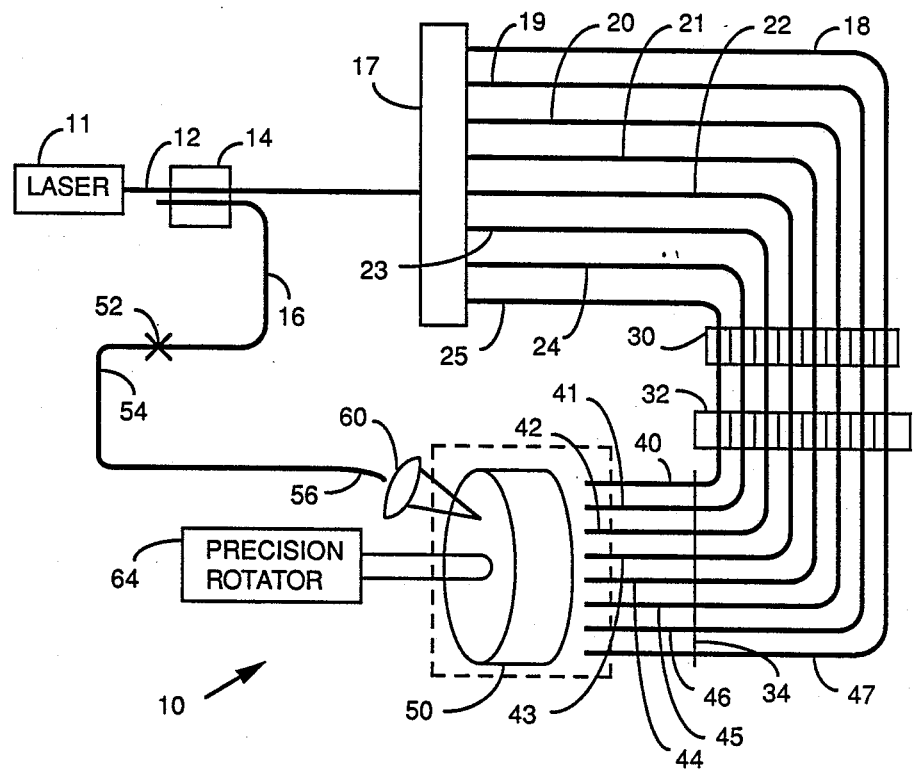
FIG. 1 is a schematic illustration of the invention showing apparatus for forming holographic rotary encoder element.

Referring to FIG. 1, an apparatus for forming an encoder system 10 according to the present invention includes a laser 11 that outputs coherent light to an optical fiber 12, which guides the light to a fiber optic directional coupler 14. The coupler 14 couples part of the light incident thereon from the laser into a second optical fiber 16.

A fiber optic directional coupler suitable for use in single mode fiber implementations of the invention is described by Bergh et al., *Electronics Letters*, Vol. 6, No. 7. pp. 260-261 (Mar. 27, 1980) and in U.S. Pat. No. 4,493,518 issued Jan. 15, 1985 to Shaw et al. That patent is assigned to the Board of Trustees of the Leland Stanford Junior University.

Light remaining in the fiber 12 propagates to a 1XN fiber optic directional coupler 17. FIG. 1 shows only a schematic representation of the 1XN coupler 17. A possible configuration for the 1XN fiber optic directional coupler 17 is described in detail subsequently with reference to FIG. 5.

The coupler 17 divides light incident thereon from the fiber 12 so that a plurality of optical fibers 18-25 guides equal optical intensities away from the coupler 17. The present invention is not limited to a 1XN coupler that contains any particular number of fibers. In any given application of the present invention, the number of fibers will be selected to meet operational requirements. Eight fibers are shown in FIG. 1 and described herein merely as an example of how one preferred embodiment of the invention may be formed.

The optical fibers 18-25 then guide light propagating therein from the coupler 17 to an optical switch array 30. FIG. 1 shows only a schematic representation of an optical switch array that may be used in the invention. One possible configuration for the optical switch array 30 is described in detail subsequently with reference to FIG. 6.

The optical fibers 18-25 then pass through a polarization controller array 32. FIG. 1 shows only a schematic representation of an polarization controller array 32 that may be used in the invention. Two possible structures for the polarization controller array 32 are described in detail subsequently with reference to FIGS. 7-9.

The optical switch array 30 includes a plurality of optical switches that may be separately actuated to control which of the fibers 18-25 guides light through the switch array 30 to the polarization controller array 32. Any combination of the fibers 18-25 may be allowed to guide light between the coupler 17 and the polarization controller 32.

After the fibers 18-25 exit the polarization controller array 32, they are butt coupled to a corresponding to plurality of fibers 40-47. In FIG. 1 line 34 between the fibers 18-25 and the fibers 40-47, respectively indicates butt coupling of the corresponding fibers 18-25 and 40-47, respectively These butt joints are temporarily formed while manufacturing the encoder 10 for the purpose of directing light from the fibers 18-25 to an unexposed holographic element 50 that is positioned at the ends of the fibers 40-47. The fibers 40-47 are preferably arranged so that their ends lie in a circle adjacent the holographic element 50. A specified spatial or angular portion of the holographic element corresponds to each one of the fibers 18-25 so that light input to the holographic element 50 from the left as viewed in FIG. 1 is output to specific fibers 18-25, depending upon whether the portion of the holographic element illuminated is opaque or transparent.

Referring to FIG. 1, the fiber 16 is butt coupled at a butt joint 52 to an optical fiber 54. A portion of the optical output of the laser 11 is coupled into the fiber 16 and then into the fiber 54. Both the optical fibers 16 and 54 are preferably single mode fibers. The optical fiber 54 has a free end 56 that directs light from the laser 11 to a lens 60. The lens 60 is arranged to expand the beam output from the fiber 54 to the illuminate the rotary holographic element with a beam that is focussed so that the light leaving the lens illuminates the entire holographic element 50. Alternate illumination patterns of and positioning of fibers 18-25 relative to the holographic element 50 are also possible. The light output from the lens 60 to the holographic element 50 is the reference beam used in forming a multiplicity of angularly multiplexed holograms.

A precision rotator device 64 is connected to the holographic element 50 to control the angular position thereof. The simplest type of rotary encoder that may be formed in accordance with the present invention has N=2 so that only the fibers 19 and 20, for example, are present in the array. This two fiber array will produce an 2-bit binary output.

The optical switch array 30 controls which of the optical fibers transmit light to the holographic element. Light from the optical fiber array interferes with the reference beam from the lens 60 and forms a pattern that may be photographically recorded in the holographic element 50. The polarization controller array is included to insure that the polarization incident output from each fiber in the array has the same polarization as the reference beam. Having the reference beam and the beams from the fiber optic array have the same polarization maximizes the difference of the intensities in the bright and dark fringes of the interference pattern and increases the quality of the holograms.

For example, the binary number 00 may correspond to a first arbitrarily selected 0° position of the rotary holographic element 54 in which all light transmission through the fibers 19 and 20 is blocked. The rotary holographic element 54 may then be rotated 90° to a second position in which the light path through the fiber 19 is open while the light path through the fiber 20 is blocked. The holographic element 54 is then exposed to from a pattern that corresponds to the binary number 01, for example. The holographic element 54 may then be rotated another 90° to a third position (180°) where the light path through the fiber 19 is blocked and the path through the fiber 20 is open. The binary number 11 may correspond to a 270° position of the holographic element 54 where the light paths through both fibers 19 and 20 are open. Table 1 shows the relation between the fibers, the angular position of the holographic element 54 and the resulting digital numbers. Table 1 refers to optical fibers 19 and 20 and fiber #1 and #2, respectively.

TABLE 1

| Angular Position | Fiber Illuminated #1 | Fiber Illuminated #2 | Digital Word |
|---|---|---|---|
| 0° | N | N | 00 |
| 90° | Y | N | 01 |
| 180° | N | Y | 10 |
| 270° | Y | Y | 11 |

The foregoing example is by way of illustration only. A two bit digital word may be formed using angular positions other than those stated above.

A digital word longer than the two bit word illustrated herein may be formed in a similar fashion. All that is necessary is to have the angular positions of the rotary encoder 50 separated by an amount sufficient to provide a one-to-one correspondence between them and the optical fibers in the array. However, the rotary encoder 50 is most conveniently formed by separating the developed portions by equal angles determined by dividing 360° by the number of fibers in the array.

Figure 2:
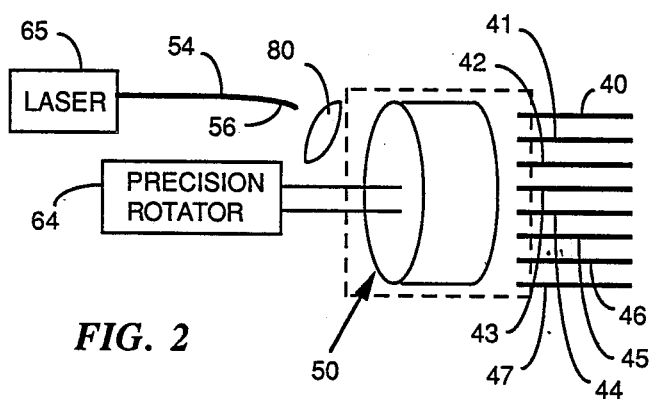
FIG. 2 illustrates the use of the holographic rotary encoder element of FIG. 1 as a signal encoder.

Referring to FIGS. 1 and 2, after the holograms are exposed, the fibers 18-25 and 40-47 may be disconnected, leaving the arrangement shown in FIG. 2. An optical signal incident upon the hologram will cause the holographic element 50 to output beams transmitted to the fibers that were used to illuminate the hologram when the hologram was made.

Referring to FIG. 2, light from a laser exits the fiber and propagates through a lens 80, which expands the beam output from the fiber to illuminate the entire holographic element 50. The holographic element has been formed according to the process described above and therefore contains a multiplicity of holograms via angular multiplexing. Each hologram represents an angular position of the holographic element 50. The holographic element contains $2^N$ holograms where N is the number of bits in the output.

Illumination of any given hologram in the holographic element 50 causes the hologram to recreate the optical images used to create it. Each hologram therefore provides an optical output having a beam of light corresponding to each fiber that carried light to the holographic element 50 when the hologram was formed. Each hologram therefore acts as a lens and refocuses the input light into a number M of the fibers. The number M and the location of the corresponding fibers receiving light depends on which the fibers were illuminated when the hologram was made. The M fibers that have light refocussed thereon correspond to bits in the digital word and represent the position of the holographic element.

Figure 4:
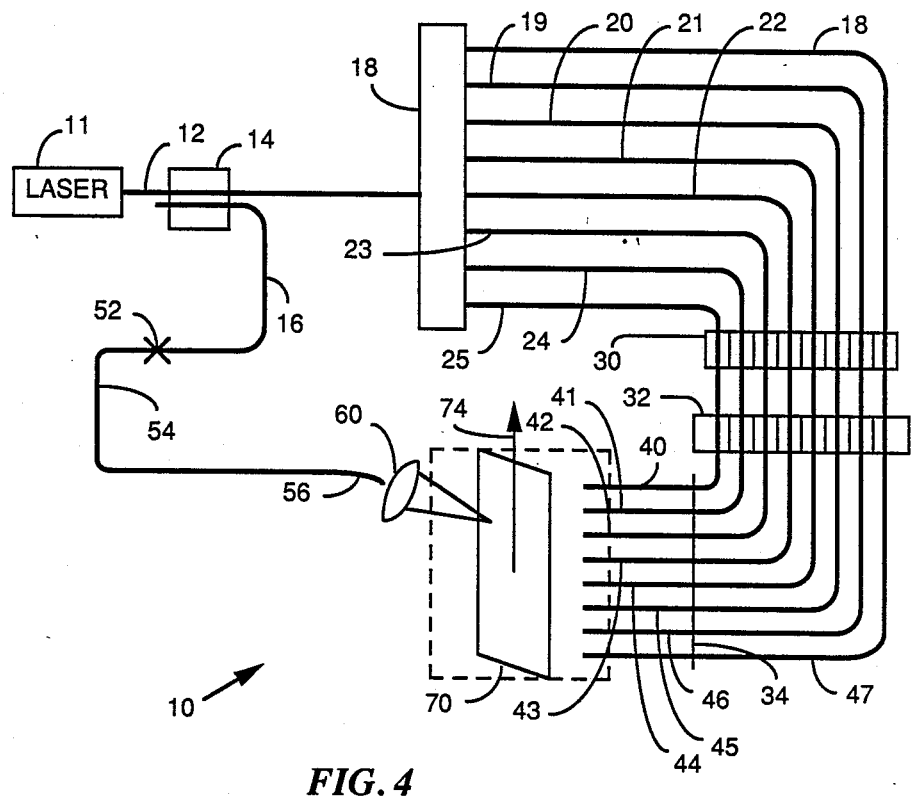
FIG. 4 illustrates apparatus for forming the linear encoder of FIG. 3.

FIG. 4 illustrates apparatus used to form a linear holographic encoder 70. The difference between FIGS. 1 and 4 is that the precision rotator 64 and the rotary holographic element 50 of FIG. 1 are replaced by the linear element 70. The linear element is exposed with light from a selected set of the fibers 40-47, for example, to form a first hologram. The linear element 70 is then translated along a translation exit 74 to a new position where a second hologram is formed with light from a second set of the fibers 40-47. The exposure and translation steps are repeated until the desired number of holograms are formed on the linear element.

Figure 3:
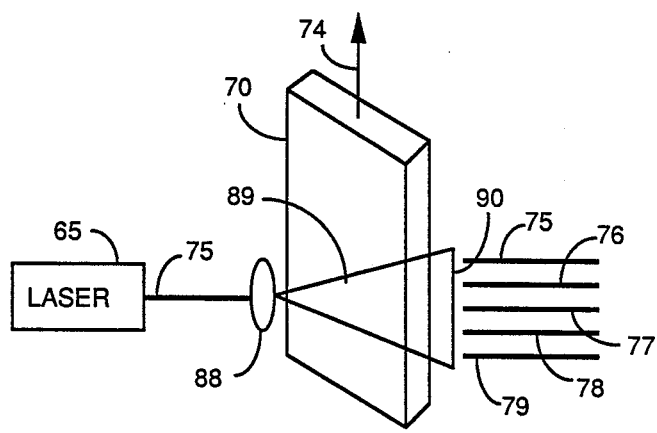
FIG. 3 illustrates the use of a linear holographic encoder element that may be used instead of the rotary encoder element of FIG. 2 as a signal encoder.

FIG. 3 illustrates the use of the linear encoder 70. Instead of rotating the holographic element 50 as in using the rotary encoder 10, use of the linear encoder 70 involves linear translation of a holographic element 70 between a succession of positions on the translation axis 74 for exposure to the light beam output from the laser 65. The linear array outputs beams corresponding to the beams from the fibers that were used to form the hologram at each selected position.

Figure 5:
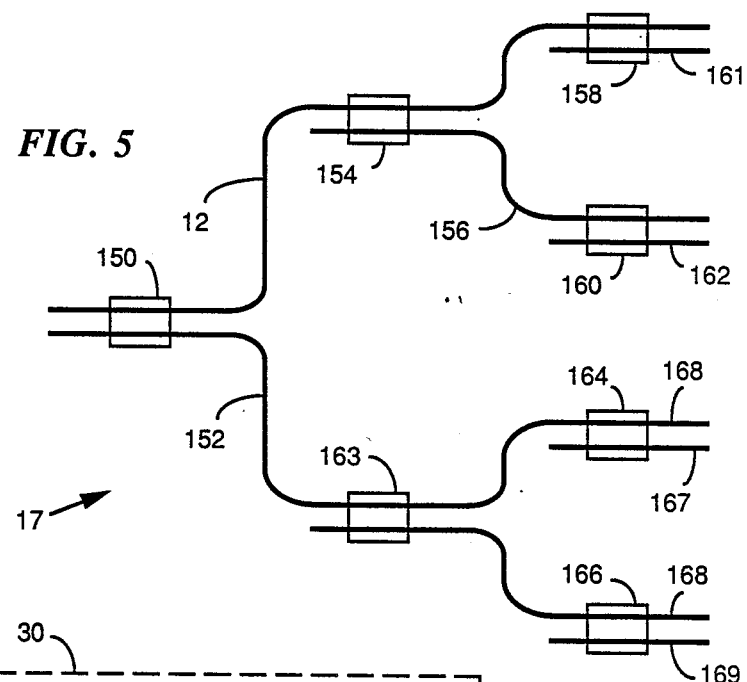
FIG. 5 illustrates a 1XN coupler that may be used in the apparatus of FIGS. 1 and 4.

The 1XN optical output 17 may be formed from a plurality of 50/50 optical couplers as shown in FIG. 5. The fiber 12 guides an optical signal output from the coupler 14 to a coupler 150, which divides the signal between the fiber 12 and a fiber 152. The signal remaining in the fiber 12 then propagates to a coupler 154, which further divides the signal between the fiber 12 and a fiber 156. The fibers 12 and 156 then guide signals to a pair of couplers 158 and 160, respectively. The coupler 158 outputs signals on the fiber 12 and a fiber 161. The coupler 160 outputs signals on the fiber 156 and a fiber 162. The signal in the optical fiber 152 propagates to a coupler 163, which then provides signals to a pair of couplers 164 and 166. The coupler 164 provides optical output signals in the fiber 152 and a fiber 167, and the coupler 166 provides optical output signals on a pair of fibers 168 and 169. Therefore, in the illustrated embodiment, the signal from the coupler 14 is divided into eight equal portions in the 1XN coupler 17.

Figure 7:
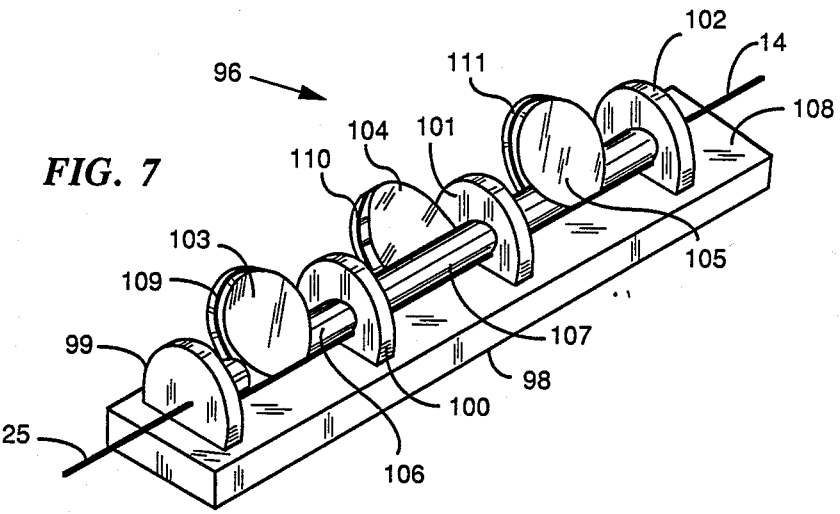
FIG. 7 illustrates a first polarization controller that may be included in the apparatus of FIGS. 1 and 4.

FIG. 7 shows one type of polarization controller 96 suitable for use in forming the polarization controller array 32 of FIG. 1. The polarization controller of FIG. 7 is disclosed in U.S. Pat. No. 4,389,090, which is hereby incorporated by reference into the present disclosure. The polarization controller array 32 may include a polarization controller 100 for each fiber in the array.

The polarization controller 96 includes a base 98 on which a plurality of upright blocks 99-102 are mounted. Between adjacent blocks 99-102 a plurality of spools 103-105 are tangentially mounted on a plurality of shafts 106-108, respectively. The shafts 106-108 are axially aligned with each other, and are rotatably mounted between the corresponding blocks 99-102. The spools 103-105 are generally cylindrical and are positioned tangentially to the shafts 106-108, with the axes of the spools 103-105 being perpendicular to the axes of the shafts. The fiber 25, for example, extends through axial bores in the shafts 106-108 and is wrapped about each of the spools 103-105 to form three corresponding coils 109-111. The radii of the coils 109-111 are such that the fiber 25 is stressed to form a birefringent medium in each of the coils 109-111. The three coils 109-111 may be rotated independently of one other about the axes of the shafts 106-108, respectively, to adjust the orientation of the birefringence of the fiber 25 and, thus, control the polarization of the light passing therethrough.

The diameter and number of turns in the coils 109-111 are such that the outer coils 109 and 111 provide a phase delay of one quarter wavelength, while the central coil 110 provides a phase delay of one-half wavelength. The quarter wavelength coils 109 and 111 control the ellipticity of the polarization, and the half wavelength coil 110 controls the direction of polarization.

The polarization controller 96 provides a full range of adjustment of the polarization of the light propagating through the fiber 25. A plurality of such polarization controllers may be arranged so that each fiber 18 has a corresponding polarization controller to form the polarization controller array 32.

Figure 8:
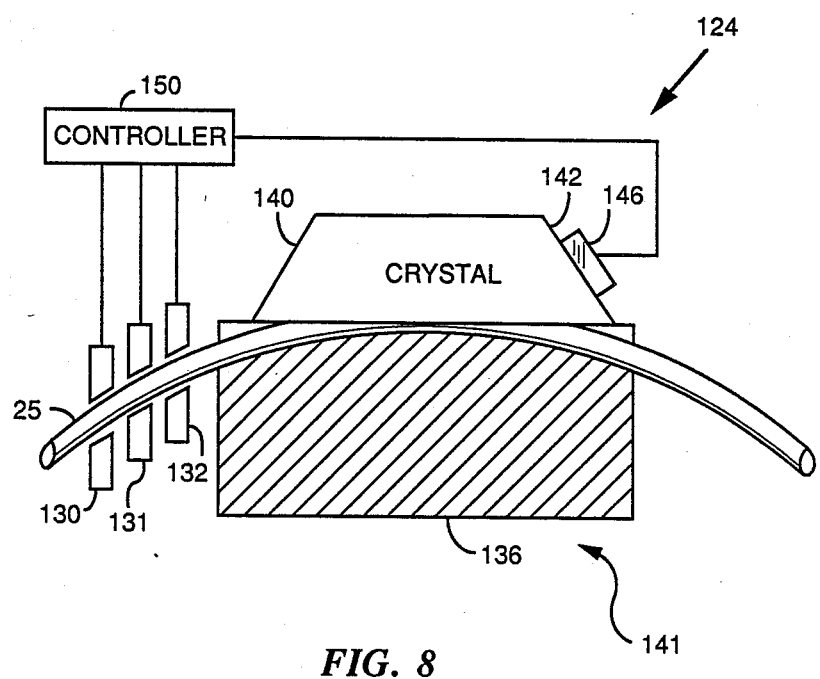
FIG. 8 illustrates an automatic polarization controller that may be included in the apparatus of FIGS. 1 and 4.

FIG. 8 illustrates an automated polarization controller system 124 that may be used to form the polarization controller array 32. The polarization controller system 124 is disclosed in U.S. Pat. No. 4,729,622, which is hereby incorporated by reference into the present disclosure. The polarization controller array 32. may be formed to include a polarization controller system 124 for each fiber in the array.

As shown in FIG. 8, the polarization controller 124 may include three fiber squeezers 130-132 to apply anisotropic stresses to the optical fiber 25, for example, to induce birefringence through the photoelastic effect. The photoelastic effect changes in the indices of refraction of the fiber 25 in response to the applied stress. Each of the fiber squeezers 130-132 preferably comprises a piezoelectric actuator element (not shown) for applying a controllable stress to the fiber 25.

Referring to FIG. 8, fiber squeezers 130-132 are placed in a line with the optical fiber 25 passing therethrough. Equal squeezer has a defined axis for applying stress to the fiber. In order to produce the desired polarization transformation, the axis of applied stresses are arranged at 45° to one another. Each squeezer achieves a phase shift which is parallel to the axis of the squeezer and a second phase shift that is perpendicular to the squeezer axis. Therefore, the three fiber squeezers 130-132 are capable of changing the polarization along two axes perpendicular to one another and to the optical fiber 25.

After passing through the fiber squeezers 130-132, the fiber 25 is then mounted in a convexly curved groove in a substrate 136. The substrate 136 and central portion of the fiber 25 in the groove are lapped to form coplanar optically flat surfaces in the cladding of the fiber 25 and the substrate 136. A birefringent crystal 140 is mounted on the optically flat surfaces in close proximity to the core of the fiber 25. The crystal 140 and the lapped surface of the fiber form a polarizer 141. The evanescent field of light in the fiber 25 interacts with the crystal 140 in a manner that depends on the polarization of the light waves. A polarization that has a slower wave velocity in the crystal 140 than in the fiber 25 is removed from the fiber 25 and excites a bulk wave in the crystal 140. A polarization that has a higher wave velocity in the crystal 140 than in the fiber 25 remains guided by the fiber 25. The refractive indices of the crystal are such that one of the two possible linear polarization states in the fiber 25 will excite a bulk wave in the crystal 140 while the other polarization state remains guided by the fiber 25.

The fiber squeezers 130-132 are used to adjust the polarization of light input to the polarizer 141 to be only the polarization that is passed through without attenuation. Any deviation form the desired polarization causes the unwanted polarization to be coupled out of the fiber 25 into the crystal 140. A photodetector 146 is mounted on a face 142 of the crystal to receive a portion of the bulk wave from the polarizaton coupled out of the fiber 25. The photodetector 146 forms an electrical error signal indicative of the intensity of the unwanted polarization. This electrical signal is fed back into an electronic control circuit 150 that controls the fiber squeezers 130-132. The control circuit 150 adjusts the fiber squeezers 130-132 to control the polarization input to the polarizer 141 to minimize the error signal. Therefore the light passed through the polarizer 141 has a single desired polarization to a high degree of accuracy.

Figure 6:
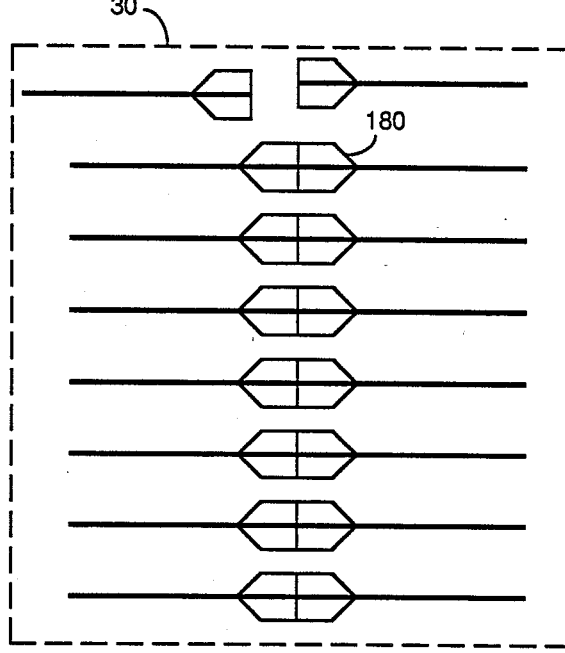
FIG. 6 illustrates an optical switch that may be used in the apparatus of FIG. 1.

Referring to FIG. 6, the optical switch array 30 may comprise a plurality of single mode fiber optic connectors 180 that may be manually connected or disconnected as required to form each hologram. Each fiber 18-25 has one such connector as shown in FIG. 6. FIG. 6 shows all but one of the connectors 180 mated to pass light.

The structures illustrated and described herein illustrate the principles of the present invention. The particular components such as the couplers, optical switches and polarization controllers described herein are exemplary of preferred embodiments. Modifications to the illustrated embodiments may be made without departing from the spirit of the present invention. Therefore the present invention includes the subject matter defined by the appended claims and all reasonable equivalents.

What is claimed is:

1. An optical signal encoder for determining the position of an object, comprising:
   a light source;
   a holographic element having a plurality of holograms formed thereon and arranged to receive light from the light source such that one of the holograms is illuminated, each hologram being configured to receive an input light beam from the light source and to produce therefrom one or more optical output signal beams encoded to correspond to a digital word indicative of the location of the hologram illuminated by the light source; and
   a fiber optic array including a plurality of optical fibers arranged to receive the optical signal beams output from the holographic element, the particular optical fibers receiving optical signal beams output from the holographic element being indicative of the location of the hologram illuminated by the light source.

2. The optical signal encoder of claim 1 wherein the plurality of holograms are arranged to be angularly spaced apart around the circumference of a circle.

3. The optical signal encoder of claim 2, further including:
   means for focussing light from the light source on the holographic element; and
   means for rotating the holographic element to place a selected one of the plurality of holograms at the location where the light from the source is focussed.

4. The optical signal encoder of claim 1 wherein the plurality of holograms are arranged to be linearly spaced apart on the holographic element.

5. The optical signal encoder of claim 4, further including:
   means for focussing light from the light source on the holographic element; and
   means for linearly translating the holographic element to place a selected one of the plurality of holograms at the location where the light from the source is focussed.

6. A method for encoding optical signals for determining the position of an object, comprising the steps of:
   providing a light source;
   forming a holographic element having a plurality of holograms thereon;
   arranging the holographic element to receive light from the light source to illuminate one of the plurality of holograms; and
   configuring each hologram to receive an input light beam from the light source and to produce therefrom one or more optical output signal beams encoded to correspond to a digital word indicative of the location of the hologram illuminated by the light source; and
   arranging a fiber optic array including a plurality of optical fibers to receive the optical signal beams output from the holographic element, the particular optical fibers receiving optical signal beams output from the holographic element being indicative of the location of the selected hologram illuminated by the light source.

7. The method of claim 6 including the step of arranging the plurality of holograms to be angularly spaced apart around the circumference of a circle.

8. The method of claim 7, further including the steps of:
   focussing light from the light source on the holographic element; and
   rotating the holographic element to place a selected one of the plurality of holograms at the location where the light from the source is focussed.

9. The method of claim 8 including the step of arranging the plurality of holograms to be linearly spaced apart on the holographic element.

10. The method of claim 9 further including the steps of:
   focussing light from the light source on the holographic element; and
   linearly translating the holographic element to place a selected one of the plurality of holograms at the location where the light from the source is focussed.

* * * * *